United States Patent
Engber et al.

(10) Patent No.: US 9,931,719 B2
(45) Date of Patent: Apr. 3, 2018

(54) METHOD FOR REPAIRING A RECEIVING HOOK FOR GUIDE VANES

(71) Applicant: MTU Aero Engines AG, Munich (DE)

(72) Inventors: Martin Engber, Munich (DE); Wolfgang Werner, Rohrbach (DE); Dirk Eckart, Wolfratshausen (DE); Juergen Lorenz, Ried (DE); Andreas Loders, Bergkirchen (DE)

(73) Assignee: MTU AERO ENGINES AG, Munich (DE)

( * ) Notice: Subject to any disclaimer, the term of this patent is extended or adjusted under 35 U.S.C. 154(b) by 355 days.

(21) Appl. No.: 14/341,962

(22) Filed: Jul. 28, 2014

(65) Prior Publication Data

US 2015/0026944 A1 Jan. 29, 2015

(30) Foreign Application Priority Data

Jul. 29, 2013 (DE) .................. 10 2013 214 781

(51) Int. Cl.
*B23P 6/00* (2006.01)
*F01D 5/00* (2006.01)
*B23K 35/02* (2006.01)

(52) U.S. Cl.
CPC .......... *B23P 6/002* (2013.01); *B23K 35/0222* (2013.01); *B23K 35/0244* (2013.01); *B23K 35/0255* (2013.01); *B23K 35/0272* (2013.01); *B23P 6/007* (2013.01); *F01D 5/005* (2013.01); *F05D 2230/30* (2013.01); *F05D 2230/80* (2013.01); *Y10T 29/4975* (2015.01);
(Continued)

(58) Field of Classification Search
CPC .......... B23P 6/002; B23P 6/007; F01D 5/005; F01D 25/246; F01D 9/042; Y10T 29/49968; Y10T 29/4975; Y10T 29/49746; Y10T 29/49734; Y10T 29/49737; F05D 2230/30; F05D 2230/80; B23K 2201/001
See application file for complete search history.

(56) References Cited

U.S. PATENT DOCUMENTS

| 4,657,171 A | 4/1987 | Robins |
| 4,743,733 A | 5/1988 | Mehta et al. |

(Continued)

FOREIGN PATENT DOCUMENTS

| DE | 10393116 T5 | 9/2005 |
| DE | 102008002572 A1 | 12/2009 |

(Continued)

OTHER PUBLICATIONS

Courtot B: "Repair Welding of High Temperature Nickel Super Alloy Castings", Thesis. School of Applied Sciences, Sep. 1, 2007 (Sep. 1, 2007), pp. 1-81, XP008108368, Found in Internet: URL:https://aerade.cranfield.ac.uk/bitstre am/1826/2598/1/Courtot-2007.pdf.

*Primary Examiner* — John C Hong
(74) *Attorney, Agent, or Firm* — Abel Law Group, LLP

(57) ABSTRACT

Disclosed is a method for repairing a receiving hook for guide vanes, wherein the receiving hook is arranged in a housing of a turbomachine. The method comprises removing first material in a region of the receiving hook, which region extends over the circumference of the housing and thereafter applying second material in or on a region which extends over the circumference of the housing. The application of second material is performed using localized heat.

20 Claims, 3 Drawing Sheets

(52) U.S. Cl.
CPC .... *Y10T 29/49734* (2015.01); *Y10T 29/49737* (2015.01); *Y10T 29/49746* (2015.01); *Y10T 29/49968* (2015.01)

(56) References Cited

U.S. PATENT DOCUMENTS

| | | | |
|---|---|---|---|
| 4,822,248 | A | 4/1989 | Wertz et al. |
| 4,897,519 | A | 1/1990 | Clark et al. |
| 5,189,279 | A | 2/1993 | Foster, III et al. |
| 5,591,363 | A | 1/1997 | Amos et al. |
| 5,914,055 | A | 6/1999 | Roberts et al. |
| 6,914,210 | B2 | 7/2005 | Grossklaus, Jr. et al. |
| 7,222,422 | B2 | 5/2007 | Gupta et al. |
| 8,074,866 | B2 | 12/2011 | Bird |
| 8,158,903 | B2 | 4/2012 | Meier |
| 8,192,152 | B2 | 6/2012 | Bunting |
| 8,266,800 | B2 | 9/2012 | Segletes et al. |
| 8,430,077 | B2 | 4/2013 | Konrad et al. |
| 2004/0084423 | A1 | 5/2004 | Grossklaus, Jr. et al. |
| 2004/0261265 | A1 | 12/2004 | Nagle et al. |
| 2005/0050705 | A1 | 3/2005 | Segletes et al. |
| 2005/0181231 | A1 | 8/2005 | Gupta et al. |
| 2005/0246893 | A1 | 11/2005 | Fukunaga et al. |
| 2007/0077148 | A1* | 4/2007 | Bird ................ B23P 6/002 416/223 R |
| 2007/0235505 | A1 | 11/2007 | Meier |
| 2008/0028605 | A1* | 2/2008 | Lutz ................ B23K 9/0026 29/889.1 |
| 2009/0123290 | A1* | 5/2009 | Imano ............... B23K 9/044 416/241 R |
| 2009/0271984 | A1 | 11/2009 | Hasselberg et al. |
| 2009/0274553 | A1 | 11/2009 | Bunting |
| 2011/0185570 | A1 | 8/2011 | Bird |
| 2011/0186003 | A1 | 8/2011 | Konrad et al. |
| 2013/0143068 | A1* | 6/2013 | Richter ............. B23K 9/04 428/636 |
| 2013/0326876 | A1 | 12/2013 | Weiss et al. |

FOREIGN PATENT DOCUMENTS

| | | |
|---|---|---|
| EP | 0176942 A1 | 4/1986 |
| EP | 1491720 A1 | 12/2004 |
| EP | 1563937 A2 | 8/2005 |
| EP | 1652952 B1 | 5/2006 |
| FR | 2959434 A1 | 11/2011 |
| JP | 2003211288 A | 7/2003 |
| WO | 2012069029 A2 | 5/2012 |
| WO | 2012095342 A1 | 7/2012 |

* cited by examiner

METHOD FOR REPAIRING A RECEIVING HOOK FOR GUIDE VANES

CROSS-REFERENCE TO RELATED APPLICATIONS

The present application claims priority under 35 U.S.C. § 119 of German Patent Application No. 102013214781.3, filed Jul. 29, 2013, the entire disclosure of which is expressly incorporated by reference herein.

BACKGROUND OF THE INVENTION

1. Field of the Invention

The present invention relates to a method for repairing receiving hooks for guide vanes.

2. Discussion of Background Information

In turbomachines, in particular in gas turbines, individual components such as guide vanes are regularly suspended or secured on mounting points in the housing. These suspension points may, over time, wear or exceed predefined tolerances, such that they have to be repaired.

It would be advantages to have available a method for repairing receiving hooks for guide vanes in turbomachines.

SUMMARY OF THE INVENTION

The present invention provides a method for repairing a receiving hook for guide vanes, which receiving hook is arranged in a housing of a turbomachine. The method comprises the removal of first material in a region of the receiving hook, which region extends over a circumference of the housing; followed by the application of second material in or on a region which extends over the circumference of the housing. The application of second material is performed using localized heat.

In one aspect of the method, the application of localized heat may be performed by a welding method, or may correspond thereto. For example, the welding method may comprise a laser powder build-up welding method and/or a plasma arc welding method.

In another aspect of the method of the present invention, the application of second material may be performed in multiple layers which are applied in circumferential direction. For example, a layer may be from 0.1 mm to 1 mm thick (e.g., about 0.3 mm thick) and/or may be from 0.5 mm to 2 mm wide (e.g., about 1 mm wide).

In yet another aspect of the method, the method may further comprise heat-treating the receiving hook or one or more sections thereof after application of the second material and/or may comprise finishing the receiving hook by a material-removing method, in particular in order to obtain structurally predefined shapes.

In a still further aspect of the method, a welding filler may be used when applying the second material.

According to the invention, a method for repairing a receiving hook is thus proposed, wherein the receiving hook is arranged in a housing, in particular in a compressor housing, of a turbomachine, in particular of a gas turbine.

A first step of the method according to the invention comprises the removal of first material in a region of the receiving hook. That region of the receiving hook in which the first material is removed extends in this case over the circumference of the housing, in particular over the entire circumference, that is to say over 360 degrees.

The subsequent method step according to the invention, but at any rate the second method step according to the invention performed after the first step, comprises the application of second material in that region of the receiving hook in which the first material has previously been removed. The region to which the material is applied thus also extends over the circumference of the housing. The application is performed using localized heat.

In all of the explanations above and below, use of the expression "may be" or "may have" and so on is to be understood as respectively synonymous with "is preferably" and "preferably has" etc. and is intended to illustrate embodiments according to the invention.

Whenever numerical words are mentioned herein, a person skilled in the art will understand these as an indication of a numerically lower limit As long as this leads to no contradiction which is apparent to the person skilled in the art, the person skilled in the art will therefore for example always understand the indication "one" as meaning "at least one". This understanding is also encompassed by the present invention alongside the interpretation that a numerical word such as "one" may alternatively be intended to mean "exactly one", wherever the person skilled in the art recognizes this as technically feasible. Both are encompassed by the present invention and are valid for all the numerical words used herein.

Advantageous developments of the present invention are respectively the subject matter of dependent claims and embodiments.

Embodiments according to the invention may comprise one or more of the features mentioned below.

In the following, gas turbines are in particular described, purely as examples of turbomachines, with no intention of restricting turbomachines to gas turbines.

In certain embodiments according to the invention, the receiving hook is arranged in a compressor housing of a gas turbine or is releasably connected thereto for its use.

In some embodiments according to the invention, the receiving hook is a mounting point.

In certain embodiments according to the invention, it is necessary to repair the receiving hook in particular because of wear. For example, a repair in compressor housings of gas turbines because of wear in the receiving portions (or mounting points) for guide vane segments in the housing of the gas turbine may be necessary.

Wear may mean that predefined tolerances are exceeded.

The term "removal" as used herein relates in particular to removal by means of a mechanical machining method, for example by turning or milling. Removal may also be performed by erosion, laser ablation or any other method.

Removal may be performed, in certain embodiments according to the invention, in steps, in stages, layer by layer or region by region.

In certain embodiments according to the invention, that region from which first material is removed and which, according to the invention, extends over the circumference, has wear marks or worn regions.

In certain embodiments according to the invention, first material of the region of the receiving hook is removed, the first material comprising, in particular, worn regions of the receiving hook.

In some embodiments according to the invention, the removal of first material includes both worn and unworn regions of the receiving hook. The removal of first material may include individual webs or shoulders, entire or individual regions of guide vane receiving portions over the entire circumference in the flow direction of the receiving hook.

In certain embodiments according to the invention, the second material is applied in the region of the receiving hook by welding, or the welding method corresponds to the application. Possible welding methods are plasma arc welding, laser beam welding, electron beam welding or other welding methods. Further possible integral joining methods are, in addition to welding, for example adhesive bonding or soldering.

The term "localized heat" as used herein denotes an introduction of heat which is restricted to a locally limited area or to a locally limited area and its immediate vicinity. For example, most welding methods require a large area for the introduction of heat in order to be able to carry out the respective welding method. Only in the case of certain welding methods, of which two methods will be described below, is localized introduction of heat sufficient.

An application of the second material using localized heat is performed, in certain embodiments according to the invention, by means of the laser powder build-up welding method and/or the plasma arc welding method. In the case of these welding methods, in comparison with other welding methods, little heat is introduced into the region of the component to be welded, in this case the region of the receiving hook. It is thus possible to limit the temperature increase in the region and thus also in the entire receiving hook. A small or limited temperature increase can advantageously minimize a possible component distortion of the receiving hook and of the entire housing.

In certain embodiments according to the invention, the application of the second material on the region of the receiving hook is performed in a plurality of layers in the circumferential direction. The layers may be applied one on top of the other and one after the other. The application of each layer may be performed in a time-delayed manner, in order for example to be able to observe certain predefined operational parameters such as heating or cooling rates for each individual layer.

In some embodiments according to the invention, up to about 100 layers—or more—are applied.

In certain embodiments according to the invention, a layer of the applied second material is between 0.1 mm and 1 mm thick in the radial direction, in relation to the axis of rotation of the gas turbine. A layer is in particular 0.3 mm (or about 3 mm) thick.

In some embodiments according to the invention, a layer is between 0 5 mm and 2 mm wide in the axial direction (in the throughflow direction of the gas turbine), in particular 1 mm (or about 1 mm) wide.

In certain embodiments according to the invention, the receiving hook is heat-treated, as a further method step, after application of the second material.

In some embodiments according to the invention, the compressor housing of the gas turbine is heat-treated with the repaired receiving hook in the installed state.

Heat treatment may, in certain embodiments according to the invention, be or include tempering. During tempering, the receiving hook and/or the compressor housing may be heated over a relatively long period in order for example to counteract mechanical stresses in the receiving hook and/or the compressor housing, e.g. in order to reduce the magnitude of mechanical stress concentrations.

In certain embodiments according to the invention, the receiving hook is finished, by means of material-removing methods, after application of the second material, for example in order to achieve or satisfy structurally predefined shapes or measurements. Material-removing methods may in particular be chip-removing methods or abrasive methods.

In some embodiments according to the invention, the second material is applied to the receiving hook using a welding filler. The welding filler may improve the wear properties of the repaired component. The repaired component may thus have lower wear, for example, and may permit a longer service life or operating time.

Some or all of the embodiments according to the invention may have one, several or all of the advantages mentioned above and/or below.

Reconstruction or repair of the receiving hook may be necessary on account of a deformation or ovalization of a compressor housing. A deformation or ovalization of the compressor housing in operation may result in what is termed rubbing of rotating components of the gas turbine, with a consequent loss of power and/or loss of stability of the gas turbine. Using the method according to the invention for repairing the receiving hook may be advantageous in the case of such deformations.

In the case of the method according to the invention, only a small quantity of heat (in comparison with other joining methods, for example tungsten inert gas welding, TIG welding for short) is introduced as localized heat. By virtue of this small quantity of heat, it is advantageously possible to minimize, limit or keep small a distortion of the receiving hook and of adjacent regions of the gas turbine, in particular of the compressor housing.

According to the invention, the application of the second material extends in particular over the entire circumference of the housing. The application may be performed by means of welding. On account of an even introduction of heat over the entire circumference over 360 degrees, low distortion (in comparison with an introduction of heat which is not performed over the entire circumference, that is to say for example only localized welding) is advantageously achieved when the gas turbine is operating as in normal use. Distortion may occur in the receiving hook and adjacent regions as a consequence of localized residual stresses which may in particular be caused by the welding.

With the method according to the invention, the receiving hook may advantageously be finished in a similar manner to a new part finishing, that is to say inter alia with respect to finishing precision and/or finishing properties, which may be equal to or greater than those of the new part.

With the application of second material, according to the invention, it is advantageously possible to reconstruct a receiving hook which may be more wear-resistant than the base material of the receiving hook onto which the second material has been applied. This may be achieved, for example, by means of a welding process involving the application of a material which is more wear-resistant than the base material. The base material may, purely by way of example, be the casting material with the designation "IN718". The second material, applied by means of welding, may be further optimized by means of suitable welding fillers and the wear resistance may thereby be increased.

The layers of the applied material in the region of the receiving hook may be between 0.1 mm and 1 mm thick, in particular (about) 0.3 mm thick. On account of these small thicknesses, distortion of the layers may be kept advantageously low. Distortions of approximately 0.1 mm or less may be achieved.

When using the method according to the invention, the laser powder build-up welding method may advantageously influence, by using suitable powders or by changing the power of the laser, the wear resistance or weldability of the receiving hook.

By means of the method according to the invention, it is advantageously possible to observe all the predefined overhaul intervals (or TBO—time between overhaul) of the gas turbine, i.e. additional or unplanned overhauls may be avoided.

BRIEF DESCRIPTION OF THE DRAWINGS

The present invention is explained by way of example with reference to the appended drawings, in which identical reference signs refer to identical or similar components. In the respectively schematically simplified figures.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
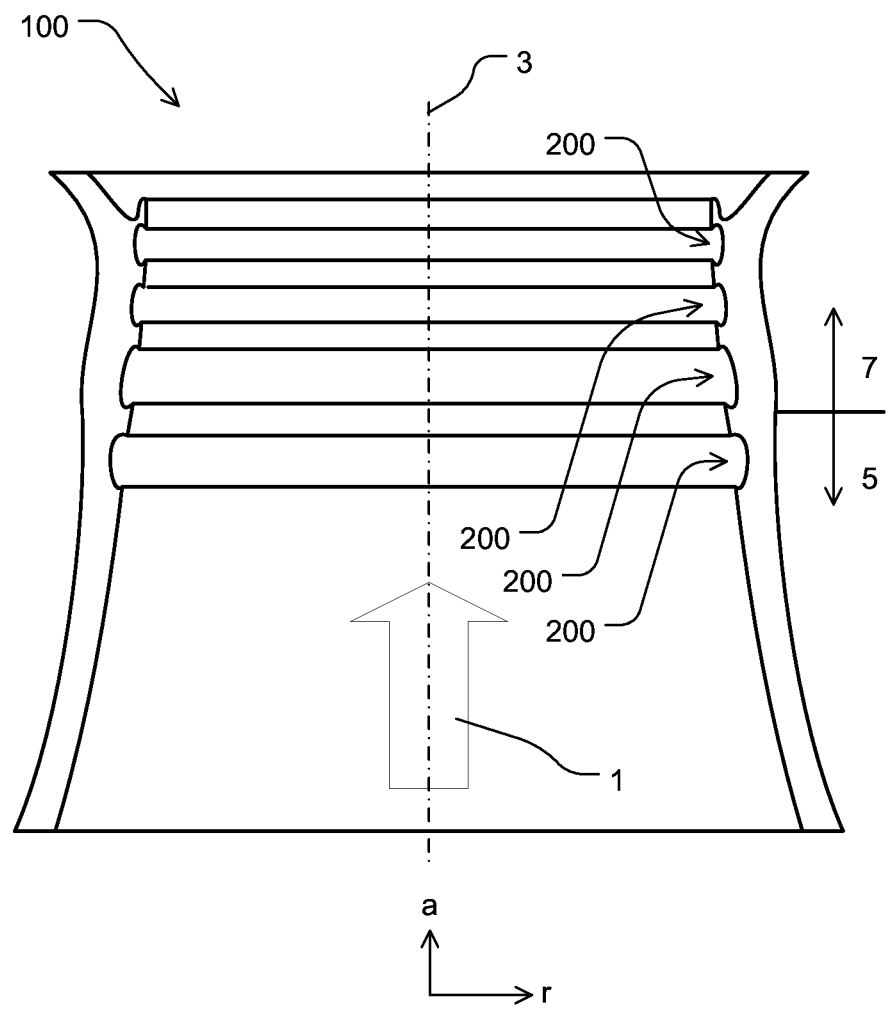
FIG. 1 shows a compressor housing of a gas turbine having a plurality of worn receiving hooks for guide vanes.

FIG. 1 shows a compressor housing 100 of a gas turbine, having a plurality of worn receiving hooks 200 for guide vanes. The guide vanes are inserted in annular fashion into the receiving hooks 200 and are connected thereto.

The principal throughflow direction 1 of the gas turbine and of the compressor housing runs in the axial direction a, as shown by means of an arrow. The radial direction r is oriented radially outward from the central axis 3 of the gas turbine.

A forward portion 5 and a rear portion 7 of the compressor housing may be distinguished. In this exemplary embodiment, worn receiving hooks 200 in the rear portion 7 of the compressor housing are in particular represented or discussed.

Figure 2:
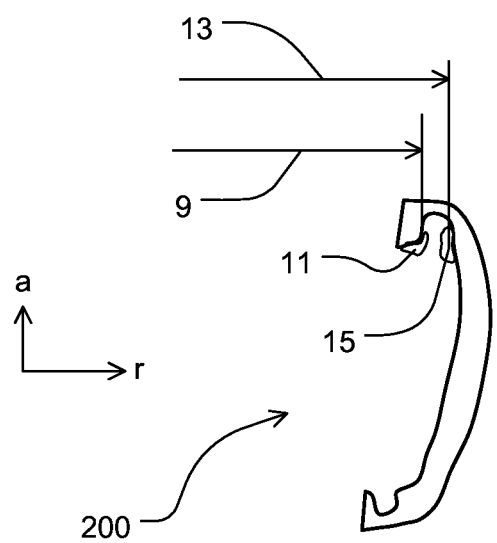
FIG. 2 shows, in a detail view, a worn receiving hook from FIG. 1.

FIG. 2 shows a worn receiving hook 200 from FIG. 1 in a detail view.

Wear marks are represented by means of an abrasion region 11 at an inner diameter 9 (as seen in the radial direction r) of the upper region of the receiving hook 200.

Equally, wear marks are represented by means of an abrasion region 15 at an outer diameter 13 of the receiving hook 200.

Figure 3A:
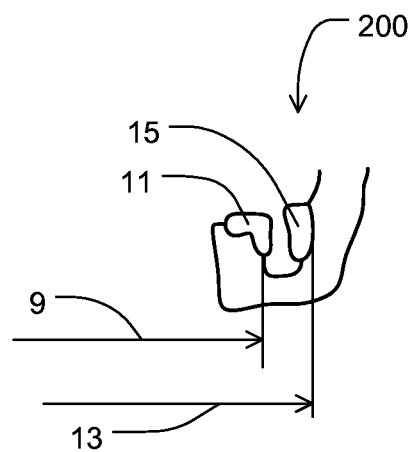
FIG. 3a-d show method steps according to the invention for repairing a worn receiving hook.

FIG. 3a shows a lower region of a worn receiving hook 200, based on the view in FIG. 2, in a further detail view. The abrasion region 11 is represented at the inner diameter 9, and the abrasion region 15 at the outer diameter 13.

The state of the receiving hook in FIG. 3a corresponds to the starting state for the method according to the invention.

Figure 3B:
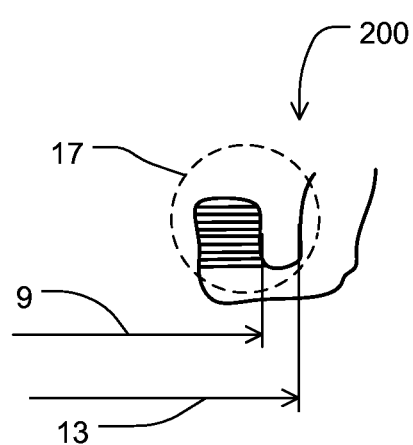

FIG. 3b shows the method step, according to the invention, of removing first material from the region 17 of the receiving hook 200. The shaded representation in the region 17 shows the first material which is to be removed or which has already been removed. The shading indicates a layer-by-layer removal of the first material.

First material is removed both at the inner diameter 9 and at the outer diameter 13. The removal is performed over the entire circumference of the receiving hook.

Figure 3C:
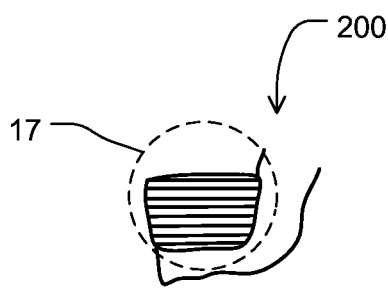

FIG. 3c shows the method steps, according to the invention, of applying second material in the region 17 of the receiving hook 200. The shaded representation in the region 17 shows the second material which is to be applied or which has already been applied.

The second material is applied, for example, by means of a laser powder build-up welding method. The powder may be applied layer by layer, as indicated by the shading.

Figure 3D:
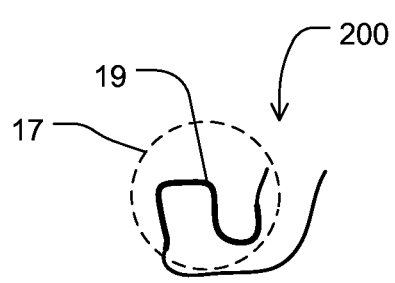

FIG. 3d shows the contour 19 (the thick line) of the finished region 17 of the receiving hook 200. FIG. 3d represents the reconstructed region 17 after carrying out the method steps of the method according to the invention.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

| List of reference signs | |
|---|---|
| Reference sign | Description |
| 100 | Compressor housing of a gas turbine |
| 200 | Receiving hook |
| a | Axial direction |
| r | Radial direction |
| 1 | Principal throughflow direction |
| 3 | Central axis |
| 5 | Forward portion of the compressor housing |
| 7 | Rear portion of the compressor housing |
| 9 | Inner diameter |
| 11 | Abrasion region at the inner diameter |
| 13 | Outer diameter |
| 15 | Abrasion region at the outer diameter |
| 17 | Region of the receiving hook for the removal of first material and for the application of second material |
| 19 | Finished contour of the receiving hook |

What is claimed is:

1. A method for repairing a receiving hook for a guide vane, which receiving hook is arranged in a housing of a turbomachine, wherein the method comprises:
    removing first material in a region of the receiving hook, which region extends over a circumference of the housing; followed by
    applying second material in or on a region which extends over the circumference of the housing, and applying the second material using localized heat.

2. The method of claim 1, wherein application of localized heat performed by a welding method, or corresponds thereto.

3. The method of claim 2, wherein the welding method comprises a laser powder build-up welding method and/or a plasma arc welding method.

4. The method of claim 2, wherein the welding method comprises a laser powder build-up welding method.

5. The method of claim 2, wherein the welding method comprises a plasma arc welding method.

6. The method of claim 2, wherein a welding filler is used when applying the second material.

7. The method of claim 1, wherein application of second material is performed in multiple layers which are applied in circumferential direction.

8. The method of claim 7, wherein a layer is from 0.1 mm to 1 mm thick.

9. The method of claim 8, wherein a layer is from 0.5 mm to 2 mm wide.

10. The method of claim 8, wherein a layer is about 1 mm wide.

11. The method of claim 7, wherein a layer is about 0.3 mm thick.

12. The method of claim 11, wherein a layer is from 0.5 mm to 2 mm wide.

13. The method of claim 11, wherein a layer is about 1 mm wide.

14. The method of claim 7, wherein a layer is from 0.5 mm to 2 mm wide.

15. The method of claim 7, wherein a layer is about 1 mm wide.

16. The method of claim 1, wherein the method further comprises heat-treating the receiving hook or one or more sections thereof after application of the second material.

17. The method of claim 16, wherein the method further comprises finishing the receiving hook by a material-removing method.

18. The method of claim 1, wherein the method further comprises finishing the receiving hook by a material-removing method.

19. The method of claim 18, wherein the finishing of the receiving hook is in order to obtain structurally predefined shapes.

20. The method of claim 1, wherein a welding filler is used when applying the second material.

* * * * *